April 4, 1967 W. R. KEOUGH 3,312,454
DRIVE AND ATMOSPHERE ARRANGEMENT IN A HEAT TREATMENT FURNACE
Filed Jan. 22, 1965 5 Sheets-Sheet 1

FIG. 1

INVENTOR.
WILLIAM R. KEOUGH

INVENTOR.
WILLIAM R. KEOUGH

INVENTOR.
WILLIAM R. KEOUGH

April 4, 1967  W. R. KEOUGH  3,312,454
DRIVE AND ATMOSPHERE ARRANGEMENT IN A HEAT TREATMENT FURNACE
Filed Jan. 22, 1965  5 Sheets-Sheet 5

INVENTOR.
WILLIAM R. KEOUGH

United States Patent Office 3,312,454
Patented Apr. 4, 1967

3,312,454
DRIVE AND ATMOSPHERE ARRANGEMENT IN A HEAT TREATMENT FURNACE
William R. Keough, Birmingham, Mich., assignor of forty-five percent to Multifastener Company, Detroit, Mich., a partnership
Filed Jan. 22, 1965, Ser. No. 427,354
11 Claims. (Cl. 263—15)

The present invention relates generally to heat treatment furnaces and more particularly to an improved furnace system, including method and apparatus, for heating workpieces, such as metal billets, as they are conveyed through a temperature controlled and/or atmosphere controlled environment within the furnace preparatory to fabrication of the billets into usable products.

A perpetual problem in the workpiece or billet heating furnace industry has been the presence of oxidation scale upon the surface of the billets as they emerge from the furnace following heating. Subsequent fabrication of the billets into products results in significant and costly waste problems because those portions of the products imbued with the scale must be discarded, for example, oxidation scale present upon the surface of heated copper billets which are subsequently extruded into copper tubing. Those sections affected by the scale must thereafter be cut out and discarded or reprocessed.

Another major problem in the furnace industry has been the seeming inability to provide in a single furnace the capability of both heating the billets to the desired temperature level and to thereafter soak the billets at that temperature level regardless of whether the furnace is programmed for automatic sequential timed discharge of the heated billets from the furnace or for discharge upon manual demand. Known prior commercial billet heating furnaces used to both heat and soak billets frequently overheat the billets being soaked, particularly when an extended holding period is necessitated, as, for example, due to the breakdown of the billet fabricating equipment.

Prior heating furnaces have also lacked durable power drive equipment having low maintenance requirements and adaptable for rapid automatically or manual billet delivery to, through and from the furnace, i.e., (1) for sequential billet loading upon the furnace conveyor system, (2) for driving the conveyor system through its prescribed furnace travel path and (3) for discharging single successive billets from the furnace upon demand.

Accordingly, it is a primary object of the present invention to provide a novel heat treatment furnace capable of heating metal billets to a desired temperature level in a controlled atmosphere preparatory to product fabrication, which treated billets are essentially free of surface oxidation scale.

Another object of this invention is to provide a novel heat treatment furnace having structure capable of maintaining selectively controllable differential temperature environment within the furnace to first heat the billets to a desired temperature level and thereafter to maintain the billet temperature level without regard to the duration of time the heated billets are retained in the furnace.

An additional object is the provision of novel, relatively maintenance-free power equipment timed for driving the furnace conveyor system and for successively charging and discharging single billets to and from the furnace conveyor system per each step advance of the furnace conveyor system according to either (1) any desired automatic program or (2) manual demand.

A further important object is to provide a novel heat treatment furnace having increased billet delivery capacity.

These and other objects and features of the present invention will become more fully apparent from the appended claims as the ensuing detailed description proceeds in conjunction with the accompanying drawings in which:

*General*

Reference is now made in detail to the drawings wherein like numerals indicate like parts throughout. A heat treatment furnace 10 is diagrammatically illustrated in longitudinal cross section in FIGURE 1. Furnace 10 is used to bring metal billets or workpieces to a temperature level, without overheating, sufficient to accommodate fabrication of the billets into final product form, e.g., into copper tubings when copper billets are being utilized. A temperature and atmosphere controlled environment 11 is defined generally by the thermally insulated enclosure formed intermediate of a top 12, a bottom 14, two side 16, front and rear walls 18 and 20, all of which are insulated in a well known manner, as well as by vertically displaceable front and rear doors 26 and 28. Walls 22, 23 and 24, along with the forward part of bottom 14, define a pair of chambers 29, removed from the high temperatures of the controlled environment 11. The chambers 29 house part of a conveyor drive apparatus 31, which is mounted at the front of furnace 10.

A pair of spaced, identical, parallel driven conveyors indicated generally at 30 and 32 (see FIGURES 2 and 3), which may be of any suitable type but preferably are the type illustrated, transport billets 33 through the controlled environment 11 of the furnace 10 between inlet opening 34 and discharge outlet opening 36. The type of conveyor illustrated is, of course, the preferred type. The details of this conveyor are disclosed in my copending application Ser. No. 427,422, filed Jan. 22, 1965, filed on even date herewith.

Conveyors 30 and 32 are each made of a series of links 40 interconnected by dogs 42 (not fully shown), which are shaped in the form of an H, i.e., having fore and aft transverse legs with a rigid rod like body interconnecting the two legs, the transverse legs being interconnected with respective adjacent links 40 to transmit tensile forces only. Thus, by inspection of FIGURE 1, it will be seen that conveyors 30 and 32 are pushed along the upper horizontal run of their respective travel paths, with successive links 40 being in contiguous abutment with each other, and are pulled around the forward and the rear direction changing devices, namely, a pair of return drums 39 and a stationary abutment 44, as well as across the lower runs of the travel paths of the conveyors 30 and 32 with the links 40 spaced from each other a distance permitted by the interconnecting dogs 42. Thus, the upper primary reach of the overall conveyor system is under compression from the conveyor drive mechanism 31 to stationary abutment 44, the links 40 being pushed thereacross and the lower return reach of the conveyor system is under tension being pulled thereacross by the drive mechanism 31. The transition from compression to tension occurs at the abutment 44 and the transition from tension to compression occurs at the drive mechanism 31 when links 40 are successively engaged by the drive mechanism 31. For each step advance of the drive mechanism 31, each conveyor 30 and 32 will be advanced a distance of one link with one link 40 tumbling downward over the stationary abutment 44, thereby discharging the billet 33 carried by the one link from its cradle position on the link through the outlet opening 36, when the rear door 28 is in the open position thereby closing limit switch LS3.

Figure 2:
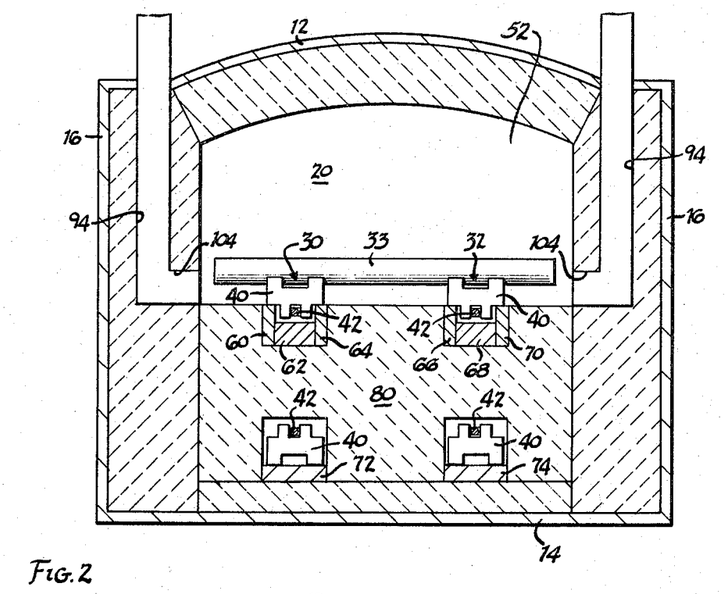
FIGURE 2 is a cross sectional view taken along line 2—2 of FIGURE 1.
Figure 3:
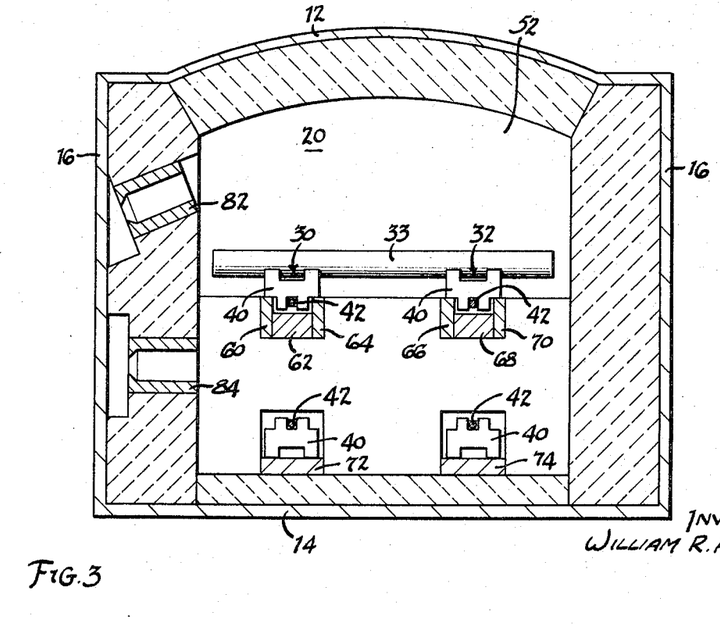
FIGURE 3 is a cross sectional view taken along line 3—3 of FIGURE 1.

The links 40 of both conveyors 30 and 32 are preferably frictionally supported during their upper horizontal run by refractory or heat resistance skids 60 and 64, and 66 and 70, respectively, which skids are held in space relation to each other by beams 62 and 68, respectively (FIGURES 2 and 3). Similarly, the inverted links 40 are frictionally supported along the major portion of the lower run of the conveyors 30 and 32 by refractory or heat resistance beams 72 and 74, respectively. The skids 60, 64, 66 and 70 as well as the beams 72 and 74 are rigidly held in the illustrated positions by spaced vertical piers 80, appropriately situated to adequately support the weight load of the billets and the conveyors.

The furnace

Figure 1:
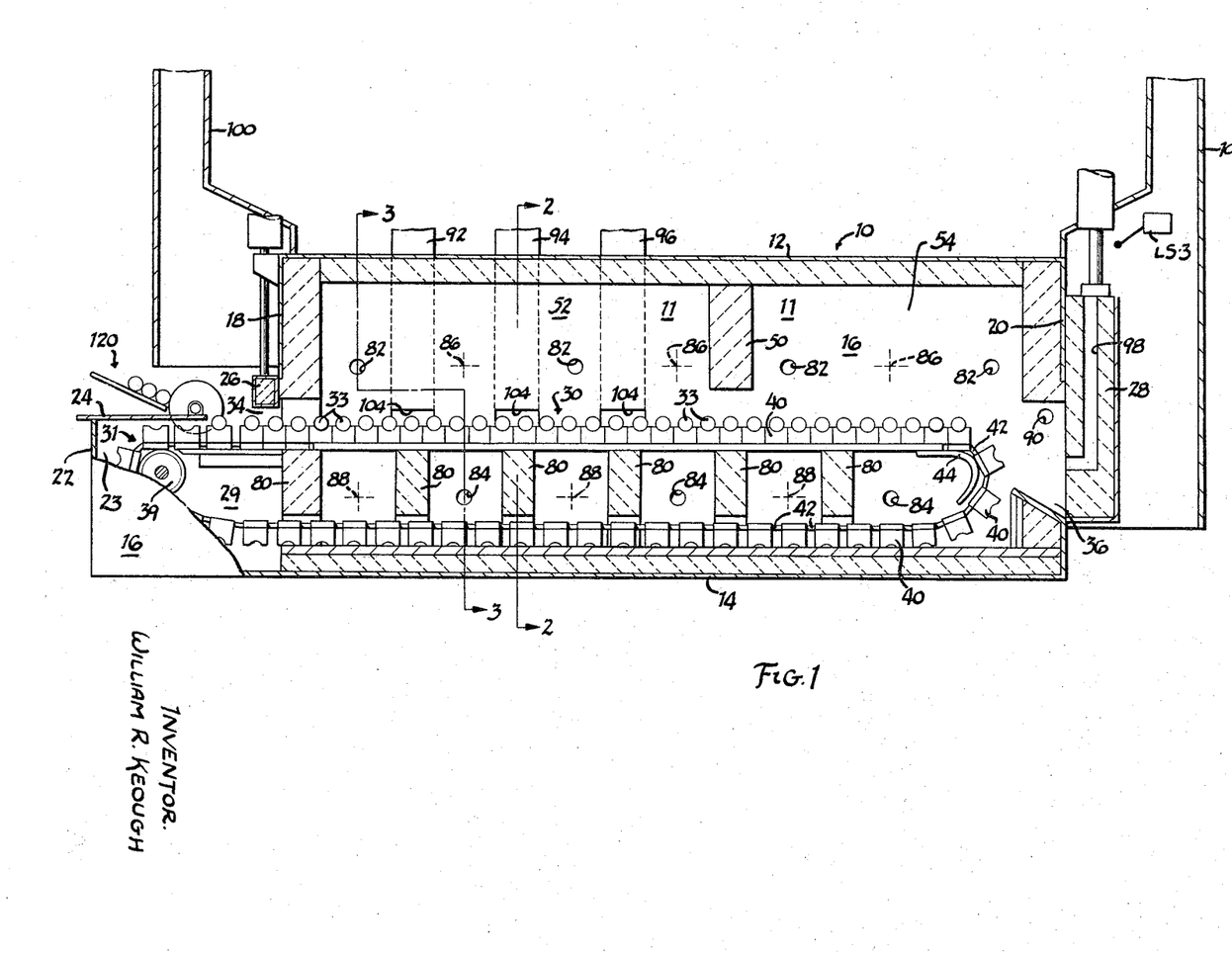
FIGURE 1 is a longitudinal cross sectional view in elevation of a presently preferred furnace embodiment of this invention.

The entire furnace 10 may be horizontally oriented as depicted in FIGURE 1 or may be oriented so as to be inclined with the respect to the horizontal, preferably with the discharge end at outlet opening 36 raised to an elevation approximately the same as the elevation of the inlet opening 34. The delivery capacity of the furnace 10 in either orientation may be on the order of 70 billets per hours as an approximate maximum.

The controlled environment 11 is divided into essentially two spaces by divider 50, which extends vertically downward from the thermal insulation of the top 12 to an elevation closely spaced from the upper run of conveyors 30 and 32 and extends transversely the full width of the furnace 10 between the two side walls 16. The space forward of divider 50 to inlet opening 34 provides a heating zone generally designated as 52. The heating zone 52 is designed to be maintained at an elevated temperature sufficient to elevate the temperature of the raw billets 33 to a level sufficient to accommodate ready fabrication of the billets into whatever final product desired when discharged from the furnace through the outlet opening 36. Thus, the temperature of the heating zone 52 may be selectively varied by means of adjustable burners, subsequently to be described, in order to accommodate various billets or workpieces composed of different metals or metal combinations and various fabricating temperatures.

The furnace space to the rear of divider 50 provides a soaking zone generally indicated at 54, which is maintained at an elevated temperature sufficient to maintain the billet temperatures attained while the billets pass through the heating zone 52, being carried therethrough upon pairs of aligned links 40 of the respective conveyors 30 and 32. Naturally, the burners contained within the thermally insulated walls of the soaking zone 54 may be controlled to vary the temperature of that zone to suit the composition of the metal billets 33 and the type of fabrication to which the billets will subsequently be subjected.

By reason of the above described internal zoned structure of furnace 10, i.e., the heating zone 52 and the soaking zone 54 serially formed in environment 11 by the divider 50, it is possible to maintain a temperature differential between the heating zone 52 and the soaking zone 54 up to on the order of 200° F., heating zone 52 normally being maintained at the higher temperature. For example, when heating copper billets for subsequent fabrication into tubing, the heating zone 52 is desirably maintained at a temperature on the order of about 1800° F. when conveyors 30 and 32 are generally continually operated. The soaking zone 54 may be maintained at a temperature on the order of about 1600° F. This feature of differential temperature level between zones allows for the unique advantage of providing in a single furnace the capabilities of first rapidly heating the billet to the desired temperature level while moving the billet step by step through the heating zone 52 and thereafter retaining the billet at the desired temperature in the soaking zone 54 which is normally maintained at a much lower temperature level to thereby substantially alleviate damage to the billets caused by overheating and allowing for discharge of the billets through outlet opening 36, each billet discharged being at the proper temperature level, regardless of the length of the holding period during which each billet was maintained in the furnace 10.

In the case of breakdown, the burners within the heating zone may be adjusted to provide less heat output or be completely turned off to avoid unnecessary heating of the billets in the heating zone 52 during the holding period. The heat output generated by the burners within the soaking zone 54 may be maintained at a level sufficient to retain the previously heated billets then situated in the soaking zone 54 at the appropriate temperature level so that when the holding period ends following repair and discharge is resumed heated billets are immediately available for discharge through outlet opening 36. Thus, the fabrication equipment, which fabricates the fully heated billets 33 into usable product form, may commence operation jointly with the furnace 10 following repair.

By inspection of FIGURES 1 and 3, it is to be observed that the relation of the burners, located within the thermally insulated walls 16 of the furnace 10, is one of criss-cross, evenly staggered relation in both the heating zone 52 and the soaking zone 54. This particular arrangement has been found to be highly efficient in generating the requisite heat in both zones. More specifically, one of the sidewalls 16 of furnace 10 has a first aligned row of burners generally indicated by circles designated numeral 82 and situated at an elevation above the billet-carrying conveyor run of conveyor 30 and 32. This same wall 16 has a second row of aligned burners indicated by circles generally designated numeral 84 and situated beneath the billet-carrying conveyor run at spaced locations approximately midway between the spaced burners 82 of the first row of burners.

The burners located on the other sidewall 16 of the furnace 10 are similarly situated into two aligned rows, of equal elevation with the previously described rows containing burners 82 and 84, but are offset with respect to the burners 82 and 84 so as, therefore, to be located at approximately the half-way points between the burners 82 and the burners 84, respectively. These two rows of burners situated on the second sidewall 16 are designated generally in FIGURE 1 by crosses identified by numerals 86 and 88, respectively. Thus, each of the sidewalls 16 has a pair of rows of burners extending through both the heating zone 52 and the soaking zone 54 along locations above and below the upper conveyor run. By reference to FIGURE 3 it is noted that upper rows of burners 82 and 86 are preferably inclined upward with respect to the horizontal to generate a better heat distribution, while burners 84 and 88 extend essentially horizontal.

Burners 82, 84, 86 and 88 may be of any suitable type wherein the proportion of air and any atomized hydrocarbon, preferably natural gas, may be selectively controlled to generate the desired measure of heat in a conventional manner.

As mentioned in the introduction of this description the creation of oxidation scale upon the surface of the billets as they are heated in a furnace results in a costly waste problem when the billets are subsequently fabricated into final product form because those portions of the final products which are embued with the scale normally are not suitable for commercial consumption and must be discarded or reprocessed. To overcome this expensive scale problem, the present invention proposes controlling the character of the atmosphere present in the furnace controlled environment 11, including both the heating zone 52 and the soaking zone 54, so as to systematically exclude the introduction of oxygen into the furnace and to also obviate the formation of free oxygen by reaction between the fluid constituents present in the temperature control environment 11. Thus, the exclusion of oxygen from the controlled environment 11 makes it impossible for oxidation scale to form upon the surface of the billets being heated.

More specifically, with particular reference to FIGURE 1, exothermic gas, which may be generated in any suitable exothermic gas generator, but preferably in the exothermic gas generator disclosed in my copending application Ser. No. 390,955, filed Aug. 23, 1964, to which reference may be made if desired, is continuously introduced into the controlled environment 11 of the furnace 10 through exothermic gas influent port 90, illustrated as being situated near the outlet opening 36. Naturally, the exothermic gas influent opening 90 may be situated anywhere within the controlled environment 11 or, in the alternative, a plurality of exothermic gas influent ports may be provided and located as desired. Normally, the exothermic gas referred to comprises gas having, by volume, on the order of 2.5 percent to 11 percent carbon monoxide, 2.5 percent to 15 percent hydrogen, 14 percent to 21 percent water, 6 percent to 11 percent carbon dioxide and 54 percent to 63 percent nitrogen.

The exothermic gas, which acts as a buffer to exclude free oxygen from the furnace interior, is continuously introduced, as previously mentioned, through port 90, and other ports if desired, and combines with the products of combustion issuing from the burners 82, 84, 86 and 88 to thereby render the controlled environment 11 oxygen-free. The products of combustion and the exothermic gas, which are normally continuously introduced into the controlled environment 11, are similarly continuously vented from the furnace. This creates a continuous flow of oxygen-free gases from the furnace, which essentially prohibits the flow of air into the furnace. The combustion gases and exothermic gas are vented from the controlled environment 11 through exhaust wall flues 92, 94 and 96 when front and rear doors 26 and 28 are in their closed positions during a holding period, for example, when conveyors 30 and 32 are held stationary. Additionally, such gas is also exhausted from the controlled environment 11 through a flue 98 disposed within the thermal insulation of the discharge door 28.

However, during normal operations the front and discharge doors 26 and 28 will open into their vertically elevated positions to accommodate continuous loading, transporting, and discharging of successive billets upon and from the conveyors 30 and 32. During such operation, the continuous inflow of gas, namely the combustion gases and the exothermic gas will be vented from the controlled environment 11, not only through wall flues 90, 94 and 96, but also will occasion a continuous flow of furnace effluent gas through inlet opening 34 and discharge opening 36, respectively. The gas issuing from the furnace 10 through the openings 34 and 36 is exhausted upward through exhaust hoods 100 and 102 immediately upon passing from the furnace as a safety measure to prevent the furnace operator or like workers from breathing the effluent furnace gases. Normally, the exhaust hoods 100 and 102 are connected to an air fan or the like (not shown) which operates to draw the furnace effluent gases upward through the exhaust hoods for subsequent venting to the atmosphere or reuse, as desired.

By inspection of FIGURE 1, it is to be noted that flues 92, 94 and 96 are located in both of the sidewalls 16 in the heating zone 52 only. That is to say, there are no wall flues in either sidewall 16 of the soaking zone 54. All six wall flues 92, 94 and 96 each have an inlet opening 104 (FIGURES 1 and 2) through which the combustion gases and exothermic gas pass as they are being vented from the furnace. The inlet openings 104 are situated at approximately the same elevation as is the upper conveyor run along which the billets 33 are conveyed through the furnace. This allows for immediate venting away from the surface of the billets of any oxygen present in the furnace at start up or oxygen which may inadvertently gain entrance into the furnace, such as when exothermic gas is not being supplied into the furnace due, for example, to a malfunction of the exothermic gas generator (not shown).

Furthermore, during normal operation, the particular placement of inlet opening 104 of the wall flues 92, 94 and 96 accommodates a continuous flow of oxygen-free gas across the surface of the billets, transversely of furnace 10 as they are moved through the heating zone 52 to further insure non-exposure of the billets to free oxygen. The flow of exothermic gas and the combustion gases through the soaking zone 54 differs from the flow in the heating zone 52 in that all gases being vented are moved in a direction longitudinal of the furnace 10 towards the outlet to be expelled from the furnace either through flue 98 when the discharge door 28 is closed or through the discharge opening 36 when that door is open to thereby insure prevention of entrance of atmospheric oxygen into the furnace from the discharge end.

Thus, the venting surface of the furnace provides a constant draw of oxygen-free gas across the surface of all the billets being heated within the furnace, whether the billets are in the heating zone 52 or the soaking zone 54.

*The billet loader mechanism*

Figures 4, 5:
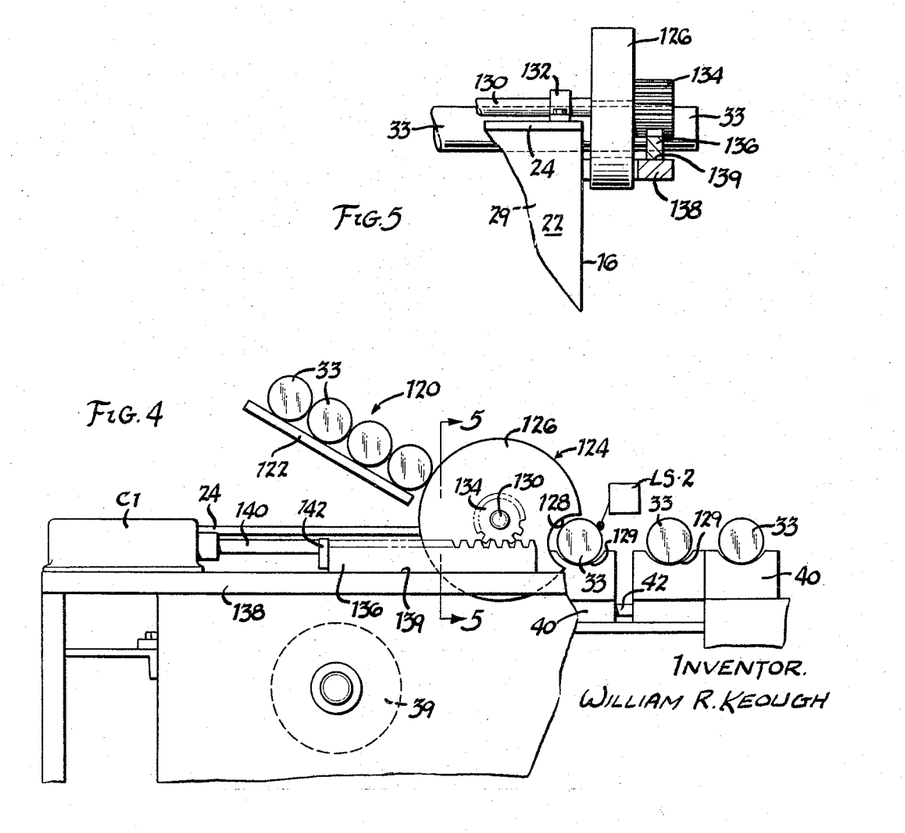
FIGURE 4 is a side elevational view of a presently preferred billet loader mechanism mounted at the front of the furnace of FIGURE 1.
FIGURE 5 is a cross sectional view taken along line 5—5 of FIGURE 4.

The billet loader mechanism, indicated generally by numeral 120 in FIGURE 1, is shown in greater detail in FIGURES 4 and 5 to which reference is now made. Broadly speaking, the billet loader mechanism 120 comprises a billet or workpiece storage magazine 122 which supplies raw billets 33 to the loading mechanism, and a rotatable loader 124.

The rotatable loader 124 is made up of a pair of recessed discs 126, each having an aligned recess 128 shaped to singly receive successive billets from the storage magazine 122 and to subsequently accommodate deposition of the billets onto the upper concavity 129 of successive, aligned links 40 of the conveyors 30 and 32, which closes limit switch LS2 (see FIGURE 4). The depositing of a billet 33 into the concavities 129 of the two aligned links 40, one of each of the two conveyors, closes limit switch LS2 signaling that the rotatable loader 124 is in readiness for opposite rotation through its arcuate path of slightly less than 180° back to a position immediately adjacent the outlet of the storage magazine 122. The two recessed discs 126 are each situated immediately toward the outside of one of the two chambers 29, respectively, the entire billet loader mechanism 120 being mounted at the front of the furnace next to the two chambers 29 so as to be situated remote from the high temperatures of the heating zone 52 to alleviate equipment maintenance problems.

As seen by inspection of FIGURES 4 and 5, each recessed disc 126, located immediately outside of one chamber 29 adjacent a sidewall 16, is nonrotatably carried by shaft 130, which is bolt fastened to the top wall 24 by means of collars 132. Externally adjacent each of the recessed discs 126 is a gear 134 also nonrotatably mounted upon the shaft 130, in any conventional manner such as by use of keys and keyways. The teeth of each gear 134 are in constant mesh with one of a pair of racks 136, which has teeth disposed along one side edge to accommodate the mentioned constant mesh. Each of the racks 136 is mounted upon a plate platform 138 for lineal reciprocating frictional movement thereacross at surface 139 responsive to actuation by a cylinder C1 which reciprocating frictional movement rotates shaft 130 along with the recessed discs 126 so that the recesses 128 thereof move between a position immediately adjacent the outlet of the storage magazine 122 and a charging or loading point immediately adjacent the links of the conveyors 30 and 32.

The cylinder C1 has a piston rod 140 which moves between extended and retracted positions and is integrally attached to a transverse bar 142, as for example, by welding. Transverse bar 142 in turn is integrally connected, as for example, by welding, to the lefthand end of both of the racks 136 as viewed in FIGURE 4, so that the racks reciprocate in unison as the piston rod 140 is extended and retracted. The cylinder C1 is rigidly connected to the platform 138, as for example, by bolt connection, and if necessary, adequate structural members are provided to stabilize the platform 138 in its illustrated cantilevered position so to project beyond the sidewalls 22 of the chambers 29, as shown in FIGURE 4. The billet loader mechanism 120 best provides a reliable, low maintenance means for supplying raw billets to the furnace and for depositing the billets upon the conveyors in timed relation with the movement of the conveyors through the furnace in a manner which will be subsequently more fully explained.

*The conveyor drive mechanism*

Figure 6:
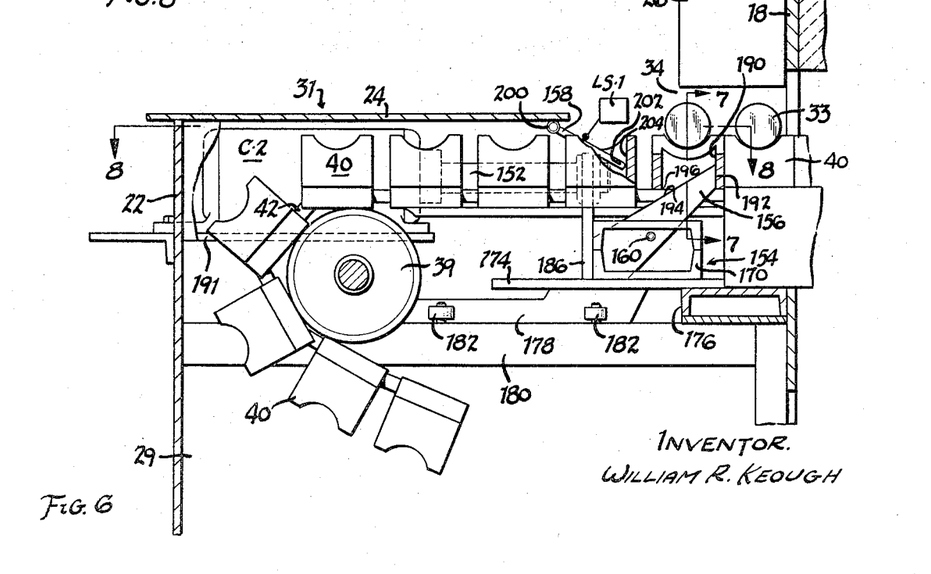
FIGURE 6 is a side elevational view shown partly in cross section illustrating a presently preferred furnace conveyor drive mechanism of this invention.
Figure 7:
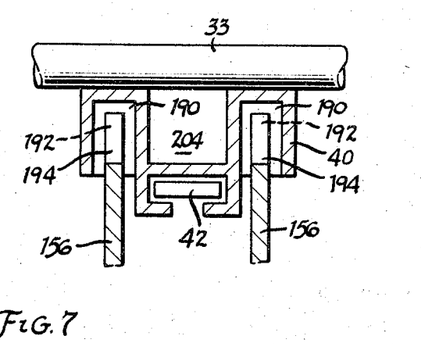
FIGURE 7 is a cross sectional view taken along line 7—7 of FIGURE 6.
Figure 8:
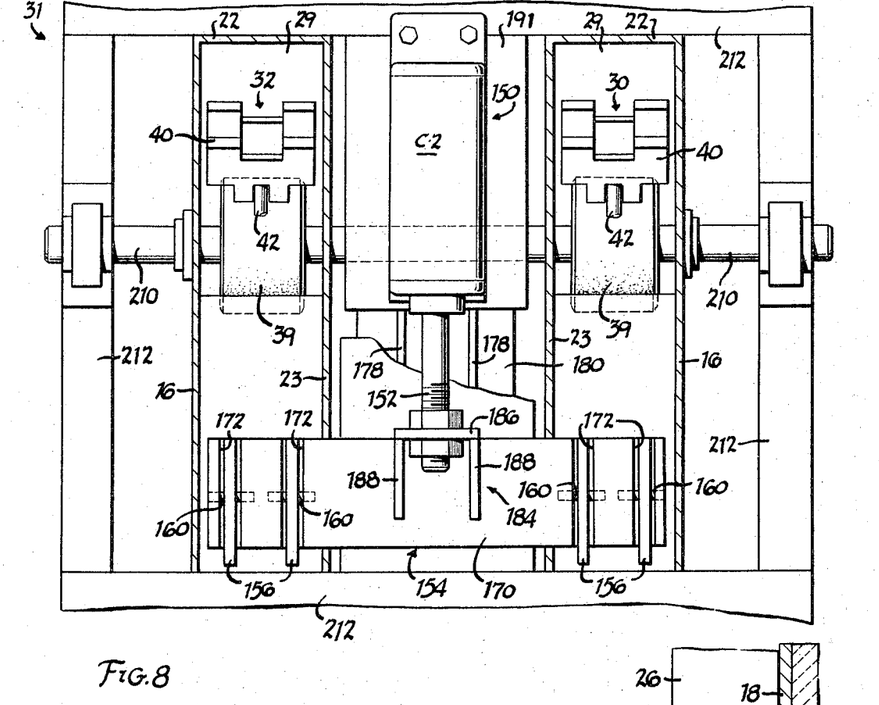
FIGURE 8 is a plan view, partly in cross section, taken along line 8—8 of FIGURE 6.

The conveyor drive mechanism, generally designated 31 in FIGURE 1, is shown in greater detail in FIGURES 6 through 8 to which reference is now made. Generally speaking, the conveyor drive mechanism 31 includes a cylinder assembly 150, including a cylinder C2 and a piston rod 152, a reciprocable carriage 154, rocker drive dogs 156, which are pivotally carried by the carriage 154, and a pair of stop levers 158. The conveyor drive mechanism 31 is situated at the front of the furnace 10 near the inlet opening 34 so as to be remote from the high temperatures generated within the controlled environment 11.

More specifically, the conveyors 30 and 32 are pushed through the majority of their upper horizontal billet-carrying run and pulled through the remainder of their endless travel path, including their lower run, by four rocker drive dogs 156 which are each eccentrically pivot-mounted on a separate shaft 160 so as to be normally gravity biased into the orientation illustrated in FIGURE 6. With respect to FIGURE 8, the two rocker drive dogs 156 at the left successively engage and successively drivingly displace each link 40 of conveyor 32 in sequential order, while the two rocker drive dogs 156 at the right successively engage each link 40 of conveyor 30 in sequential order, as the four rocker drive dogs are linearly reciprocated along with the carriage 153 between extended and retracted positions.

The carriage 154 comprises a transverse rectangular beam 170 which is slotted along four locations designated 172 to accommodate the pivotal movement of the pivot-mounting of the dogs 156, which are carried upon the four independent shafts 160. Shafts 160 are secured to the transverse beam 170 as for example by welding. Additional structural components of the carriage 154 include a base plate 174, which is integral with the transverse beam 170, another transverse beam 176, which is unitarily connected to the forward end of base plate 174 as, for example, by welding, and a longitudinally extending channel support 178, which is integrally secured to the base plate 174 as, for example by welding. By this construction, the assembly of rocker drive dogs 156 and the carriage 154, including the transverse beam 170, the base plate 174, the beam 176 and the channel support 178 move in unison between extended and retracted positions, with the bottom surfaces of beam 176 and of channel support 178 frictionally engaging and moving across a stationary inverted channel platform 180. The carriage 154 is alignedly guided between the extended and retracted positions by engagement between the vertical exterior sides of the channel support 178 and four roller assemblies 182. Two of the roller assemblies are located along each vertical exterior side of the channel support 178. The carriage 154 also includes structure, generally designated by numeral 184, for interconnecting the transverse beam 170 to the piston rod 152. The interconnection 184 comprises a vertical backing plate 186 which is fastened by threads and nuts to the piston rod 152 and by welding to beam 170. A pair of vertically extending triangularly-shaped side braces 188 are welded to the sides of the backing plate 186 and to the top of beam 170.

Hence, as the cylinder C2 is bolt mounted upon a depressed platform 191, is actuated to move the piston rod 152 between its extended and retracted positions and vice versa, the carriage 154 moves unitarily with the piston rod 152. Thus, during the extension stroke the two pairs of dogs 156, as depicted in FIGURE 8, each engage at surfaces 192 a recessed surface 190 of the two links 40 of the conveyors 30 and 32 then situated at the driving station. As the piston rod 152 is extended by actuation of the cylinder C2 to move the carriage 154 toward the furnace interior both of the conveyors 30 and 32 are simultaneously advanced in unison by reason of the engagement between the rocker drive surfaces 192 and the link surfaces 190 (see FIGURE 7). The amount of conveyor advance occasioned by each stroke cycle of the carriage 154 is equal to the length of each link 40 measured in the direction of conveyor movement. This provides for loading of a single billet 33 upon the aligned links of the conveyors and for positive discharging of a heated billet from the conveyors through the discharge opening 36 for each stroke cycle of the carriage 154.

Upon the retraction stroke of the carriage 154, the upper surface 194 of each of the dogs 156 is brought into impact engagement with a corner surface 196 of the associate link 40 which causes the dogs 156, upon further retraction of the carriage 154, to rotate clockwise, as viewed in FIGURE 6, about their respective pivot shaft 160. The drive surface 192 of each dog 156 clears the link surface 190 of the next succeeding link 40 at the completion of the retraction stroke. At this point, the eccentric weight distribution of the dogs 156 about their respective pivot shaft 160 causes counterclockwise rotation of the dogs 156 to accommodate engagement between the drive surfaces 192 and the link surfaces 190 in readiness for the next extension stroke of the carriage 154.

During the retraction stroke previously described, reverse movement of the conveyors 30 and 32, i.e., counterclockwise movement about the two idler drums 39 as viewed in FIGURE 6, is prohibited by a pair of gravity biased levers 158 which are rotatably carried in sleeves 200, which sleeves are integrally connected to the top plate 24 as, for example, by welding. The engagement between each stop end 202 and an associate link surface 204 obviate any reverse conveyor motion. Since the two stop levers 158 are gravity biased their undersurface freely moves across the top of each successive adjoining link 40 as the conveyors are moved forward during the extension stroke of the carriage 154. When the next succeeding link 40 is advanced a sufficient distance to permit the stop end 202 of each of the levers 158 to clear the link surface 204 the levers 158 again fall into the orientation depicted in FIGURE 6, by reason of the force of gravity acting upon the eccentrically mounted levers.

In passing it should be noted that both conveyor reversing idler drums 39 are merely mounted upon idler shaft 210, which is appropriately journaled and carried principally by means of a frame generally designated 212. Neither the drums 39, which are nonrotatably carried upon the shaft 210, nor the shaft 210 are directly driven. Consequently, the direction reversing drums 39 are merely idlers which accommodate movement of the conveyor links from their lower run to their upper run responsive to the extension stroke of the carriage 154 as a cylinder C2 is actuated.

Thus, by means of the above-described conveyor drive mechanism 31, a highly dependable, low maintenance conveyor drive unit is provided which allows for step by step single conveyor link advance per each stroke cycle, the limit switch LS1 signaling the advance of each successive empty pair of space links 40 as the two conveyors are step by step advanced by actuation of the carriage 154 along with the eccentrically mounted rocker drive dogs 156. When the advance of empty aligned links 40 close limit switch LS1, a signal is generated which informs the billet loader mechanism 120 that an additional billet may be delivered to the links. Also by reason of the single link or billet station advance per each stroke cycle of the conveyor drive mechanism 31, a single billet is positively discharged through the outlet opening 36 per each link advance during normal operation.

*Operation*

The furnace 10 is in a state of readiness for continuous operation when, with reference to FIGURE 1, each of the paired links 40 of the conveyors 30 and 32 between the billet loader mechanism 120 and the stationary direction changing abutment 44 are carrying a billet 33. The inlet and discharge doors 26 and 28 are opened allowing for continuous effluent flow of exothermic gas mixed with the combustion gases issuing from the burners 82, 84, 86 and 88. These gases are evacuated through the inlet and outlet hoods 100 and 102 respectively, and are also drawn transversely of the furnace across the surface of the billets contained within the heating zone 52 and vented from that zone into the inlet openings 104 and through the wall flues 92, 94 and 96. The exothermic gas is introduced into the interior of the furnace 10 through port 90. The piston rod 140 of the cylinder C1, which is part of the billet loader mechanism 120, is in its retracted position, with the rotatable loader 124 positioned as illustrated in FIGURE 4. The piston rod 152, which extends from and is actuated by the cylinder C2, is in its extended position thereby positioning the carriage 154 with the rocker drive dogs 156 in the position illustrated in FIGURES 6 and 8.

Figure 11:
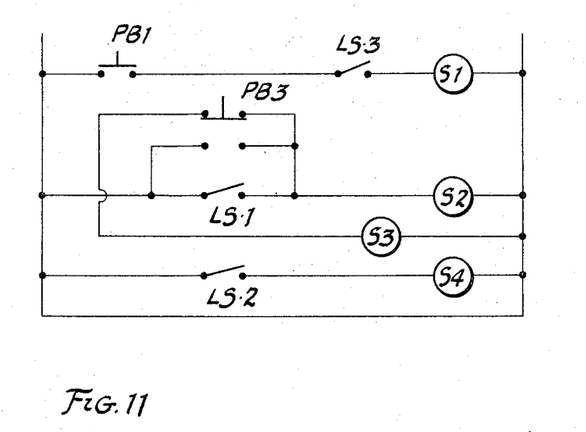
FIGURE 11 constitutes a simplified schematic diagram of the electrical portion of the novel furnace of FIGURE 1.

During manual operation, push button PB1 of the electrical schematic FIGURE 11, is pressed by the furnace operator when a heated billet is needed by the billet fabrication equipment (not shown). The discharging door 28, being in its opened elevated position has closed limit switch LS3, thus energizing a solenoid S1 (see FIGURES 9 and 11). The energization of solenoid S1 draws a valve spool 230 toward the left as viewed in FIGURE 9 thereby allowing fluid to pass in a valve inlet 232, through the barrel of a valve V1, and through a hydraulic line 234. A hydraulic line 236 is closed by the position assumed by the valve spool 230. The fluid passing through hydraulic line 234 issues into the rear of the cylinder C1 of the billet loading mechanism 120 while fluid in the forward end of the cylinder C1 is exhausted through a hydraulic line 238 thereby causing the piston rod 140 to move toward its extended position. The extension of the piston rod 140, with reference to FIGURE 4, moves both of the racks 136 frictionally along the upper surface 139 of the platform 138 and, by reason of the constant mesh between the gear teeth of the racks 136 and the gear teeth of the shaft mounted gears 134, the recessed discs 126 are rotated counterclockwise so that each recess 128 assumes a position immediately adjacent the outlet end of the billet storage magazine 122. At this point in time, a billet 33 is deposited from the magazine 122 into the recesses 128 of the discs 126 preparatory to subsequent deposition upon the cradle forming concavities 129 of the next pair of successive links 40.

At the same time, the extension stroke of the piston rod 152 has been previously completed so that the stop end 202 of each gravity biased stop lever 158 has cleared surface 204 of the adjoining links 40 and has fallen into the position illustrated in FIGURE 6. This causes the levers 158 to close the limit switch LS1 and thereby energize the solenoid S2 and the solenoid S3 through override PB3 (see FIGURES 9, 10 and 11).

Figures 9, 10:
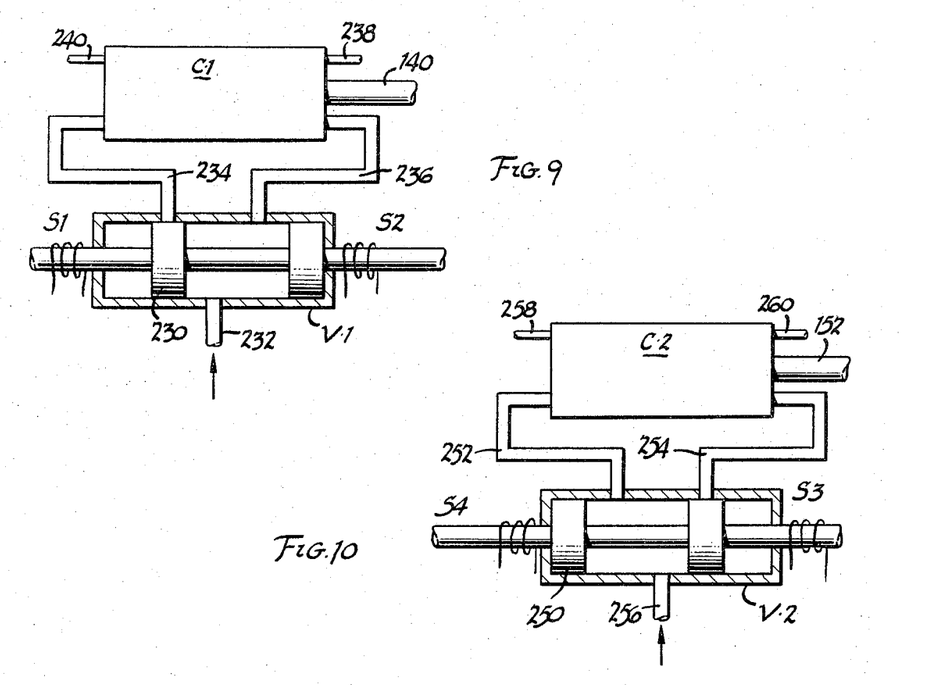
FIGURE 9 is a schematic illustration of the cylinder and valve mechanism used to actuate the billet loader mechanism of FIGURE 4.
FIGURE 10 is a schematic illustration of the cylinder and valve mechanism used to actuate the furnace conveyor drive mechanism of FIGURE 6.

Energization of solenoid S2 moves the valve spool 230 within the barrel of the valve V1 toward the right as viewed in FIGURE 9 thereby closing the hydraulic line 234 and opening the hydraulic line 236. Hydraulic fluid under pressure therefore flows through inlet hydraulic line 232 through the barrel of valve V1, through the hydraulic line 236 and into the forward end of the cylinder C1 to move piston rod 140 toward its retracted position, while hydraulic fluid in the rear of the cylinder C1 is exhausted through hydraulic line 240. Retraction of piston rod 140 rotates the recessed discs 126 along with a single billet 33 cradled in the recesses 128 clockwise moving the recesses 128 from a position immediately adjacent the outlet of the billet storage magazine 122 to the position illustrated in FIGURE 4 thereby depositing the billet upon the cradling concavities 129 of the pair of aligned conveyor links 40 of the conveyors 30 and 32.

Energization of the solenoid S3 moves a valve spool 250 (see FIGURE 10) from its illustrated position in FIGURE 10 toward the right so that the spool 250 cuts off hydraulic flow through a hydraulic line 252 and simultaneously opens a hydraulic line 254 to accommodate fluid communication with the barrel of the valve V2 which is supplied with hydraulic fluid through inlet port 256. The hydraulic fluid passing from port 256 through the barrel of the valve V2 and through the hydraulic line 254 enters the front of the cylinder C2 to move the piston rod 152 of the conveyor drive mechanism 31 toward its retracted position while hydraulic fluid within the rear of cylinder C2 is exhausted through hydraulic line 258. Retraction of the piston rod 152 displaces the carriage 154 along with the rocker drive dogs 156 of the conveyor drive mechanism 31 from right to left as viewed in FIGURE 6. This retraction causes the upper surface 194 of the dogs 156 to contact the corner surface 196 of the respective associated links 40 thereby rotating the dogs clockwise about their respective pivot shaft 160 as the dogs are retracted, stop levers 158 preventing reverse movement of the conveyors 30 and 32 at this time. When the forward surfaces 192 of the dogs 156 have cleared the link surface 190 of the next successive link 40, the dogs 156 rotate counterclockwise till they assume their original orientation with surface 192 and 190 in abutting relation and are in a state of readiness to advance the conveyors another step.

At this juncture, as previously described, a new billet 33 is deposited from the recess 128 of the billet loader mechanism 120 upon the next pair of links 40 of the two conveyors. The depositing of this billet upon the links of the conveyor closes limit switch LS2 (FIGURE 4) to energize solenoid S4. Energization of the solenoid S4 displaces the valve spool 250 from right to left as viewed in FIGURE 10 into the illustrated position opening the hydraulic line 252 for fluid communication through the barrel of the valve V2 and closing the hydraulic line 254. This accommodates flow of hydraulic fluid from port 256, through the barrel of the valve V2, through the hydraulic line 252 and into the back of the cylinder C2 to move the piston rod 152 toward its extended position while the hydraulic fluid in the front of the cylinder C2 is exhausted through a hydraulic line 260.

The advancement of the piston rod 152 moves the carriage 154 along with the rocker drive dogs 156 from left toward right into the position illustrated in FIGURE 6 thereby advancing both conveyors 30 and 32 a distance approximately equal to the length of one link 40 measured in the direction in which the conveyors move. The next successive pair of links 40 are thus positioned preparatory to receiving an additional single raw billet, while a single heated billet is positively discharged through the furnace discharge opening 36. The above-described operation may now be repeated according to manual demand or may cyclically function according to any desired program for automatic cyclic repetition.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a furnace for heating metal billets carried through a temperature controlled environment within the furnace between billet loading and discharging stations upon conveying means, a billet loading assembly having billet storage means and rotatable loading means selectively actuatable by reciprocating prime mover and kinematic means to successively transport a single billet from the storage means to the conveying means with each full stroke of the prime mover and a conveyor drive assembly selectively movable in timed relation with the billet charging assembly to advance the conveying means a single billet station at a time and having reciprocating power means and carriage means rotatably carrying normally gravity biased rocker dogs between extended and retracted positions to advance the conveying means a billet station per extension stroke and stop means gravity biased against the conveying means during the retraction stroke of the conveying power means to alleviate reverse movement of the conveying means.

2. A method of manipulating fluid media in a heat treatment furnace to treat metal billets being moved through a temperature and atmosphere controlled environment including a heating zone and a soaking zone of the furnace upon conveying means, without incurrence of surface oxidation-scaling on the billets, comprising the steps of: consecutively introducing the raw billets into the controlled environment upon the conveying means at a selectively controllable sequence, advancing the billet-carrying conveying means through the heating and soaking zones at a selectively controllable sequence, burning a mixture of atomized hydrocarbon and air at a selectively controllable rate to (1) form oxygen-free fluid products of combustion and (2) maintain the heating and soaking zones at different temperature levels each above the ready oxidation temperature of the billets and within the hydrocarbon combustion temperature range, the temperature differential between the zones being up to on the order of 200° F., introducing exothermic gas into the controlled environment at a selectively controllable rate to thereby maintain said environment oxygen-free by continuously excluding introduction of atmospheric oxygen into the furnace, venting the products of combustion and the exothermic gas from the heating zone of the furnace through appropriately located flues at a selectively controllable rate, exhausting the products of combustion and the exothermic gas from the temperature controlled environment through the exit from the soaking zone of the furnace when closed.

3. A method of successively conveying billets through a temperature controlled environment within a heat treating furnace between billet-loading and discharging stations upon conveying means driven by a reciprocating prime mover and including a billet loader at the charging station, said furnace having openable door means at at least one of said loading and discharging stations, comprising the steps of: normally advancing the conveying means a single billet station step between the loading and discharging stations to positively discharge a single billet per each full power cycle of the prime mover, normally loading the conveying means with a single billet for each full cycle of the billet loader, occasioning last-mentioned step in timed relation to the first step and prohibiting conveying means advance and billet loading and discharging when any of said door means is closed.

4. A furnace for heat treating metal billets moving through a temperature controlled environment within the furnace between billet-loading and discharging stations having openable doors upon conveying means comprising an insulated housing accommodating creation of the temperature controlled environment, burner means situated above and below the billet-carrying path of the conveying means along the sides of the housing within the temperature controlled environment for generating heat sufficient to appropriately raise and thereafter maintain the temperature of the billets and vent means in communication with the temperature control environment having inlet means situated generally at the approximate elevation of the billet-carrying path of the conveying means, at least a portion of said venting means being disposed in one of said doors to allow venting at one of said stations when said doors are closed.

5. A method of manipulating fluid media in a heat treating furnace having doors at opposite ends to treat billets being moved through a temperature and atmosphere controlled environment of the furnace upon conveying means, without incurrence of oxidation scaling along the surface of the billets, comprising the steps of: consecutively introducing the raw billets into the controlled environment by the conveying means at a controllable rate, advancing the billet-carrying conveying means through the controlled environment at a controllable rate, burning a mixture of atomized hydrocarbon and air at a controllable rate to thereby (1) form oxygen-free fluid products of combustion and (2) maintain the temperature of the controlled environment at a level above the oxidation temperature of the billets and within the hydrocarbon combustion temperature range, introducing exothermic gas into the controlled environment at a controllable rate to thereby maintain said environment as an oxygen-free buffer zone by continuously excluding introduction of oxygen into the furnace, exhausting the products of combustion and the exothermic gas from the controlled environment through one of said doors, when closed, at a controllable rate, and discharging the treated billets from the furnace at a controllable rate for subsequent fabrication.

6. A furnace for heat treating metal billets moving through a temperature controlled environment within the furnace between billet loading and discharging stations having movable doors upon conveying means comprising an insulated housing serially forming a heating zone and a soaking zone within the temperature controlled environment, burner means within the heating zone for generating heat sufficient to appropriately raise the temperature of the billets, burner means within the soaking zone for generating a heat sufficient to maintain the billets at a desired temperature after heating, venting flue means in communication with the heating zone and situated within the insulated walls of the housing and venting means in said door at the discharge station for venting said soaking station when said door is closed.

7. In a furnace for heat treating metal billets carried through a temperature controlled environment within the furnace between billet charging and discharging stations upon conveying means, the improvement comprising a conveyor drive assembly selectively movable to advance the conveying means a single billet station at the time and having cylinder assembly power means, a carriage attached to the piston rod of the cylinder assembly and carrying drive dogs repeatedly engageable with selected portions of the conveying means to advance the conveying means during the extension stroke of the piston rod, said carriage and drive dogs being reciprocable between extended and retracted positions responsive to actuation of the cylinder assembly to thereby advance the conveying means one billet station per carriage extension stroke, said drive dogs being rocker dogs rotatably mounted upon the carriage so as to be normally gravity biased for appropriate engagement with one of said selected portions of the conveying means but anti-gravity rotatable by engagement with another portion of the conveying means during the retraction stroke of the carriage, and stop means gravity biased against the conveying means during the retraction stroke of the carriage to prevent reverse movement of the conveying means.

8. A device as defined in claim 7 wherein said conveying means are two spaced conveyors with a plurality of successive interconnected links, wherein said conveyor drive assembly is attached remote from the high temperatures of the controlled environment and wherein said rocker dogs are four in number aligned two-by-two adjacent to said space conveyors for successive engagement against aligned links of said conveyors within link recesses.

9. A furnace for heat treating metal billets moving through a temperature controlled environment within the furnace between billet loading and discharging stations upon conveying means comprising an insulated housing including openable doors at the loading and discharging stations and an internal divider forming seriatim a heating zone and a soaking zone within the temperature controlled environment, a plurality of burners arranged in a criss-cross evenly staggered pattern along the opposed sides of the housing above and below the billet-carrying path of the conveying means within the heating zone for generating heat sufficient to appropriately raise the temperature of the billets, a plurality of burners arranged in a criss-cross evenly staggered pattern along the opposed sides of the housing above and below the billet-carrying path of the conveying means within the soaking zone for generating heat sufficient to maintain the billets at a desired temperature, the temperature between the heating and soaking zones being selectively controllably up to on the order of 200° F., a plurality of flues having inlet openings located generally at the approximate elevation of the billet-carrying path of the conveying means within the insulated side-walls of the housing communicating solely with and venting the heating zone, exothermic gas influent means for introducing exothermic gas into the temperature controlled environment to create an oxygen-free buffer zone by continuously excluding introduction of atmospheric oxygen into the furnace, and at least one vent passage located within the door at the discharge station in communication with the soaking zone.

10. A furnace for heat treating metal billets moving through a temperature and atmosphere controlled environment within the furnace between billet loading and discharging stations upon conveying means comprising an insulated housing including openable doors at the loading and discharging stations, respectively, forming the temperature controlled environment, burner means within the temperature controlled environment for generating heat sufficient to appropriately raise and thereafter maintain the temperature of the billets, vent means having inlet means in communication with the temperature controlled environment at least part of said vent means being situated in the door at the discharging station, and exothermic gas influent means for introducing exothermic gas into the temperature controlled environment to thereby establish an oxygen-free buffer zone therein by continuously excluding introduction of oxygen into the environment.

11. In a furnace for heat treating metal workpieces carried through a temperature controlled environment within the furnace between workpiece charging and discharging stations upon conveying means, the improvement comprising a conveyor drive assembly selectively operable to advance the conveying means station by station and having power means, carriage means carrying drive dogs successively engageable with selected portions of the conveying means to drive the conveying means through its prescribed travel path, said carriage means and drive dogs being reciprocable between extended and retracted positions responsive to actuation of the power means to thereby advance the conveying means one billet station per carriage means extension, and stop means selectively biased against the conveying means during the retraction stroke of the carriage means to alleviate reverse movement of the conveying means.

References Cited by the Examiner
UNITED STATES PATENTS

| | | | |
|---|---|---|---|
| 1,252,561 | 1/1918 | Fassinger | 263—8 X |
| 1,382,149 | 6/1921 | Walker | 263—8 X |
| 1,610,567 | 12/1926 | Marsh et al. | 263—39 X |
| 1,739,497 | 12/1929 | Beach | 263—8 X |
| 1,906,659 | 5/1933 | Talley | 198—203 X |
| 2,091,172 | 8/1937 | Wilson | 263—6 |
| 2,141,163 | 12/1938 | Braun | 263—6 X |
| 2,691,515 | 10/1954 | Nesbitt | 263—6 |
| 2,799,491 | 7/1957 | Rusciano | 263—15 X |
| 2,872,174 | 2/1959 | Lindquist | 263—6 |
| 3,105,863 | 10/1963 | Holcroft et al. | 263—36 X |

FREDERICK L. MATTESON, JR., *Primary Examiner.*

JOHN J. CAMBY, *Examiner.*